US012421760B2

(12) United States Patent
Gopavaram et al.

(10) Patent No.: US 12,421,760 B2
(45) Date of Patent: Sep. 23, 2025

(54) SYSTEM AND METHOD TO POWER A LOCKBOX

(71) Applicant: Carrier Corporation, Palm Beach Gardens, FL (US)

(72) Inventors: Subhash Reddy Gopavaram, Telangana (IN); Ramesh Lingala, Telangana (IN)

(73) Assignee: HONEYWELL INTERNATIONAL INC., Charlotte, NC (US)

(*) Notice: Subject to any disclaimer, the term of this patent is extended or adjusted under 35 U.S.C. 154(b) by 374 days.

(21) Appl. No.: 17/952,477

(22) Filed: Sep. 26, 2022

(65) Prior Publication Data

US 2023/0100697 A1    Mar. 30, 2023

Related U.S. Application Data

(60) Provisional application No. 63/248,730, filed on Sep. 27, 2021.

(51) Int. Cl.
  *E05B 19/00* (2006.01)
  *E05B 47/00* (2006.01)

(52) U.S. Cl.
  CPC ...... *E05B 19/0005* (2013.01); *E05B 47/0002* (2013.01); *E05B 2047/0058* (2013.01); *E05B 2047/0095* (2013.01)

(58) Field of Classification Search
  CPC ............. E05B 19/0005; E05B 47/0002; E05B 2047/0058; E05B 2047/0095
  See application file for complete search history.

(56) References Cited

U.S. PATENT DOCUMENTS

| 4,651,544 A | 3/1987 | Hungerford |
| 4,766,746 A | 8/1988 | Henderson et al. |
| 4,851,652 A | 7/1989 | Imran |
| 5,280,518 A * | 1/1994 | Danler ............... G07C 9/00817 340/5.23 |
| 5,791,172 A * | 8/1998 | Deighton ............ E05B 19/0005 292/201 |
| 5,794,466 A | 8/1998 | Hungerford et al. |
| 6,046,558 A * | 4/2000 | Larson ............... G07C 9/00896 318/281 |
| 6,318,134 B1 | 11/2001 | Mossberg et al. |
| 6,442,983 B1 * | 9/2002 | Thomas .............. E05B 47/0012 70/278.1 |
| 7,086,258 B2 | 8/2006 | Fisher et al. |

(Continued)

FOREIGN PATENT DOCUMENTS

| CN | 204627161 U | 9/2015 |
| CN | 213573434 U | 6/2021 |

(Continued)

*Primary Examiner* — Mark A Williams
(74) *Attorney, Agent, or Firm* — CANTOR COLBURN LLP

(57) ABSTRACT

A lock box includes: a chassis; a lower housing solenoid attached to the chassis; a removable lower housing removably connected to the chassis through the lower housing solenoid; and a battery holder configured to removably secure a primary battery within the battery holder, such that the primary battery is configured to move with the removable lower housing, the primary battery being configured to provide electricity to the lower housing solenoid.

11 Claims, 7 Drawing Sheets

(56) References Cited

U.S. PATENT DOCUMENTS

| | | |
|---|---|---|
| 8,453,481 B2 | 6/2013 | Meekma |
| 8,640,514 B2 | 2/2014 | Goren et al. |
| 8,806,907 B2 | 8/2014 | Kalous et al. |
| 9,194,157 B2 | 11/2015 | Bahar |
| 9,540,845 B1 | 1/2017 | Yang |
| 9,771,737 B1 | 9/2017 | Rais |
| 11,017,625 B2* | 5/2021 | Ou .......................... G07F 17/12 |
| 11,715,339 B1* | 8/2023 | Hilmas .................. G07C 9/215 |
| | | 340/5.61 |
| 2003/0179075 A1* | 9/2003 | Greenman ............. G07C 9/215 |
| | | 340/5.73 |
| 2005/0206499 A1* | 9/2005 | Fisher .................. E05B 19/0005 |
| | | 713/185 |
| 2009/0293562 A1* | 12/2009 | Fisher ................... E05B 67/063 |
| | | 70/278.7 |
| 2012/0306617 A1 | 12/2012 | Tung |
| 2018/0190056 A1* | 7/2018 | Desinor, Jr. ........ G07C 9/00309 |
| 2020/0312067 A1* | 10/2020 | Fisher ................ E05B 65/5246 |

FOREIGN PATENT DOCUMENTS

| | | |
|---|---|---|
| EP | 1178167 A1 | 2/2002 |
| GB | 2544925 A | 5/2017 |
| KR | 101120694 B1 | 4/2012 |
| KR | 102262153 A | 5/2021 |

* cited by examiner

SYSTEM AND METHOD TO POWER A LOCKBOX

CROSS-REFERENCE TO RELATED APPLICATIONS

This application claims the benefit of Provisional Application No. 63/248,730 filed Sep. 27, 2021, the disclosure of which is incorporated herein by reference in its entirety.

BACKGROUND

The embodiments herein generally relate to lockboxes and more specifically, a method and apparatus to supply electrical energy to such lockboxes.

Lockboxes are typically used to a provide a secured storage area for a key or the access card or other access aid at a location close to a locked property accessible by the key or the access card. In this way, an authorized user can unlock the secured storage area, obtain the key or the access card and then use the key or the access card to unlock the locked property.

The locked property may be a home or other property that is locked while unattended by a traditional lock that requires a key or an access card. In other situations, the locked property may be a commercial or industrial site, or other type of property.

The lockbox is typically attached to a door handle or to another stationary object near the traditional lock. The lockbox is typically configured to require the user to demonstrate that he is authorized to obtain access to the locked property before the secured storage area is unlocked to allow the user to obtain the key or the access card. In a mechanical lockbox, the user might be required to enter a correct lock combination to access the secured storage area. In an electronic lockbox, the user might be required to communicate a credential to the lockbox (via a physical connection to the lockbox or via a wireless link to the lockbox) to access the secured storage area.

BRIEF DESCRIPTION

According to one embodiment, a lockbox is provided. The lock box includes: a chassis; a lower housing solenoid attached to the chassis; a removable lower housing removably connected to the chassis through the lower housing solenoid; and a battery holder configured to removably secure a primary battery within the battery holder, such that the primary battery is configured to move with the removable lower housing, the primary battery being configured to provide electricity to the lower housing solenoid.

In addition to one or more of the features described above, or as an alternative, further embodiments of may include an outer cover attached to the chassis, the outer cover being configured to enclose the chassis, the lower housing solenoid, the removable lower housing, and the primary battery within the outer cover.

In addition to one or more of the features described above, or as an alternative, further embodiments of may include that the removable lower housing further includes a first slot and a second slot, and wherein the lower housing solenoid further includes a first side, a second side opposite the first side, a first plunger is configured to project away from the first side to engage with the first slot, and a second plunger configured to project away from the second side to engage with the second slot.

In addition to one or more of the features described above, or as an alternative, further embodiments of may include that the removable lower housing further includes a first column and a second column, wherein the first slot is located in the first column and the second slot is located in the second column.

In addition to one or more of the features described above, or as an alternative, further embodiments of may include that the removable lower housing further includes: a key storage area configured to retain at least one of a key or an access card therein.

In addition to one or more of the features described above, or as an alternative, further embodiments of may include that the removable lower housing further includes: a first housing side and a second housing side located opposite the first housing side, wherein the battery holder is located on the first housing side and the key storage area is located on the second housing side.

In addition to one or more of the features described above, or as an alternative, further embodiments of may include that the removable lower housing further includes a first electrical lead located within the battery holder, and wherein the primary battery is configured to electrically connect to the first electrical lead when the primary battery is located within the battery holder.

In addition to one or more of the features described above, or as an alternative, further embodiments of may include a second electrical lead attached to the chassis, wherein the primary battery is configured to electrically connect to the second electrical lead when the removable lower housing is secured to the chassis through the lower housing.

In addition to one or more of the features described above, or as an alternative, further embodiments of may include that the second electrical lead further includes a contact spring and an attachment bracket.

In addition to one or more of the features described above, or as an alternative, further embodiments of may include a shackle solenoid, the primary battery being configured to provide electricity to the shackle solenoid; and a shackle removably connected to the chassis through the shackle solenoid.

In addition to one or more of the features described above, or as an alternative, further embodiments of may include that the shackle further includes a first prong, a first shackle slot located in the first prong, a second prong, and a second shackle slot located in the second prong, and wherein the shackle solenoid further includes a first solenoid side, a second solenoid side opposite the first solenoid side, a first shackle plunger is configured to project away from the first solenoid side to engage with the first shackle slot, and a second shackle plunger configured to project away from the second solenoid side to engage with the second shackle slot.

In addition to one or more of the features described above, or as an alternative, further embodiments of may include a backup battery configured to power the lower housing solenoid and the shackle solenoid when the primary battery is out of electricity.

According to another embodiment, a removable lower housing for a lockbox is provided. The removable lower housing including: a first slot configured to engage with a first plunger of a lower housing solenoid of a lock box; a second slot configured to engage with a second plunger of the lower housing solenoid of the lock box; and a battery holder configured to removably secure a primary battery within the battery holder, such that the primary battery is configured to move with the removable lower housing.

In addition to one or more of the features described above, or as an alternative, further embodiments of may include that a first column, the first slot being located in the first column; and a second column, the second slot being located in the second column.

In addition to one or more of the features described above, or as an alternative, further embodiments of may include that a key storage area configured to retain at least one of a key or an access card therein.

In addition to one or more of the features described above, or as an alternative, further embodiments of may include a first housing side; and a second housing side located opposite the first housing side, wherein the battery holder is located on the first housing side and the key storage area is located on the second housing side.

In addition to one or more of the features described above, or as an alternative, further embodiments of may include a first electrical lead located within the battery holder, and wherein the primary battery is configured to electrically connect to the first electrical lead when the primary battery is located within the battery holder.

According to another embodiment, a method of assembling a lock box is provided. The method including: inserting a primary battery into a battery holder of a removable lower housing to electrically connect the primary battery to a first electrical lead attached to the removable lower housing; and inserting the removable lower housing with the primary battery into an outer cover to engage a first slot of the removable lower housing with a first plunger of a lower housing solenoid, to engage a second slot of the removable lower housing with a second plunger of the lower housing solenoid, and to electrically connect the primary battery to a second electrical lead.

Technical effects of embodiments of the present disclosure include securing a primary battery to a removable lower housing of a lockbox that would also be removed for access to the key or the access card, which would make the primary battery easy to remove and replace.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Conventional lockboxes are typically powered by a single battery, which is located deep in the lockbox, which makes it too difficult to replace. Therefore, conventional lockboxes are typically disposed of if a new battery is required, which unfortunately leads to unintended waste. The embodiments disclosed herein seek to provide a lockbox with a primary battery in a convenient location that provides easy access to remove and replace the battery.

Figure 1:
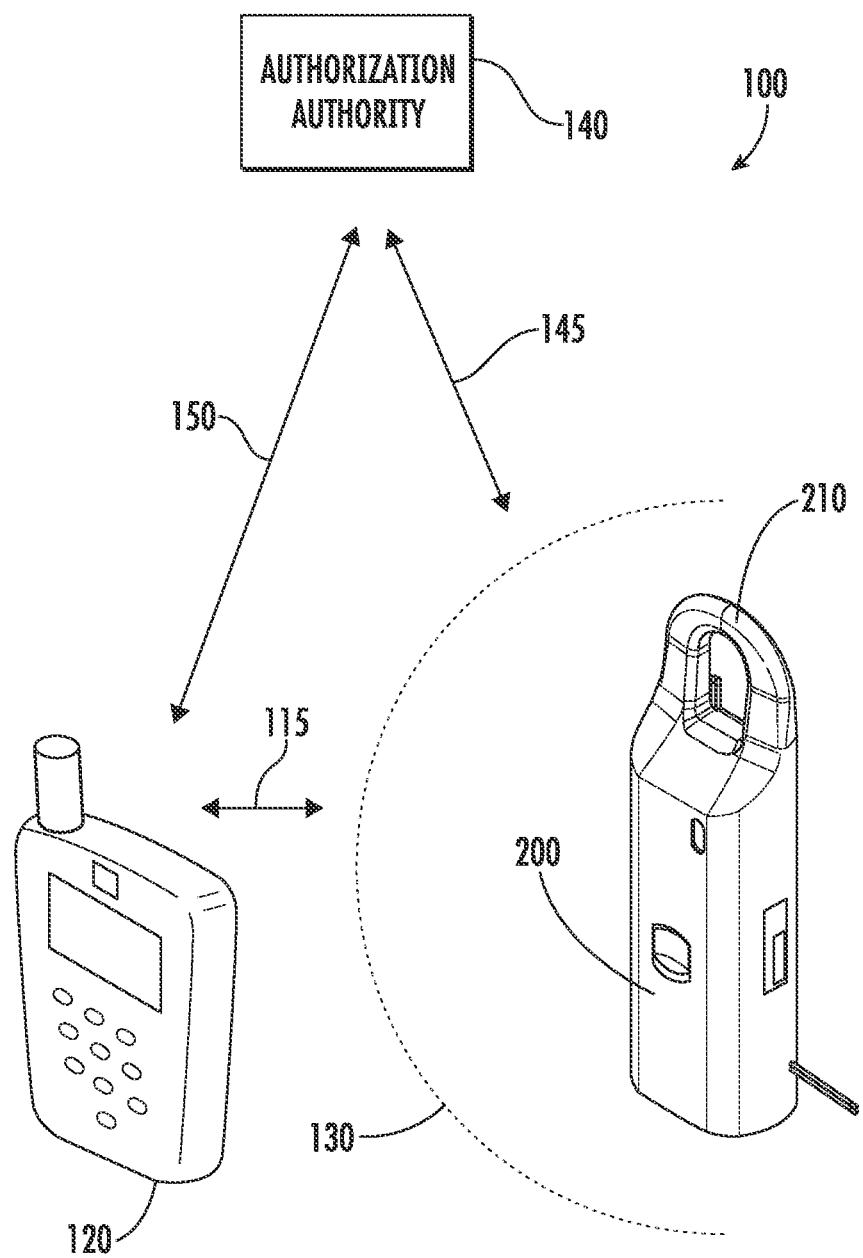
FIG. 1 is a schematic illustration of a lockbox and access device, which also shows a remote authorization entity that may be linked to the lockbox and/or the access device, according to an embodiment of the present disclosure.

FIG. 1 is schematic view of a representative restricted range lockbox and access key system 100, according to an embodiment of the present disclosure. A lockbox 200 with wireless communications capability is shown in relation to an access device, which in this example is a cellular telephone 120. The restricted range of the lockbox is shown schematically at 130. Thus, the cellular telephone as shown in FIG. 1 is outside of the lockbox's operating range 130, and would need to be moved within the range 130 to communicate with the lockbox 200.

Communications between the lockbox 200 and the cellular telephone 120 may be two-way, as indicated by the two-way arrow representing a communications link 115. The communications link 115 may be infrared, Bluetooth, Low-Energy Bluetooth, Near Field Communication (NFC), or any other similar communication method known to one of skill in the art. In some cases, one-way communication from the cellular telephone 120 to the lockbox 200 may be sufficient.

All of the conventional lockbox functions are supported. Thus, the communications from the cellular telephone 120 to the lockbox 200 would include the ability for the user of the cellular telephone 120 to make an access request directed to the lockbox 200. This access request would include communication of a credential indicating that the user is authorized for access.

In response, the lockbox may communicate a message, either via a display on the lockbox or via a message transmitted to the cellular telephone 120, denying access. Access may be denied, e.g., if the user is unauthorized, if the user's credentials have expired, or if the access privileges have been superseded (i.e., if the property owner has overridden access privileges or is invoking the call before showing feature).

Figure 2:
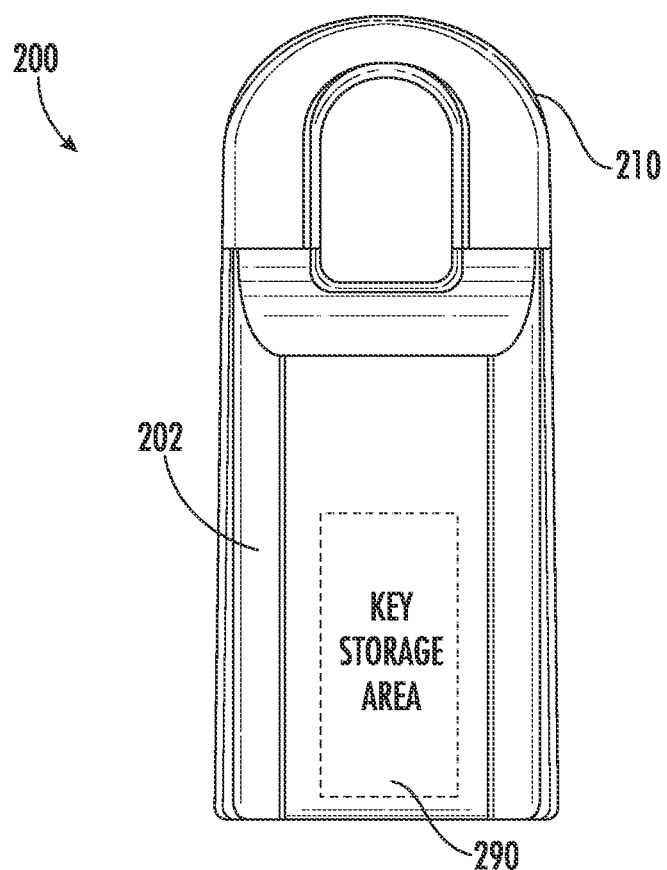
FIG. 2 is a schematic view of a lockbox showing a storage area suitable for holding one or more keys, access cards, or other access aids, according to an embodiment of the present disclosure.

If access is granted, the lockbox 200 allows the user to gain access to a key storage area 290 (FIG. 2) in the lockbox 200 or open a shackle 210 for removing the lockbox 200 from an object to which it is attached (e.g., a door). In specific implementations, the lockbox has a circuit that controls a lock mechanism that secures the key storage area 290 and shackle 210 in a locked condition when in use.

When an access request is granted, the circuit unlocks the lock mechanism to provide the user access to the storage area 290, the shackle, or both. The internal components of the lockbox 200 and the key storage area 290 are protected from the external environment by an outer cover 202. The outer cover 202 may be composed of a tough durable material to prevent someone from breaking into the lockbox 200 and removing the key or the access card in the key storage area 290.

The lockbox 200 functions with power received from a removal battery and a backup battery in the lockbox 200, discuss later herein. The cellular telephone 120 may be any cellular telephone having restricted range wireless communications capability or other equivalent access device.

Optionally, the access key system 100 may also include an authorization authority 140, which can be linked to the lockbox 200 (via a link 145), or to the cellular telephone 120 (via the link 150) or to both the lockbox 200 and the cellular telephone 120. The authorization authority can administer granting credentials to users, collect information on usage and activity and provide for updates to devices (lockboxes and access devices) in the access key system 100.

There are a number of possible ways to implement restricted range wireless communications by which the communicating devices are magnetically coupled. As only one example, the devices can be configured according to the Near Field Communication standards.

NFC is described as a standards based, short range wireless connectivity technology that enables simple and safe two-way interactions among appropriately configured electronic devices. Near Field Communication is based on inductive-coupling, where loosely coupled inductive circuits share power and data over a distance of a few centimeters. NFC devices share some similarities with proximity (13.56 MHz) RFID tags and contactless smartcards, but have a number of new features.

NFC is described as being fast, private, and easy as compared to other wireless standards. The NFC set-up time is less than 0.1 millisecond, which is much less than the Bluetooth set-up time of about 6 seconds and less than the IrDa set-up time of about 0.5 second. The NFC operating range is 10 cm or less, which is shorter and provides for more privacy than RFID (operating range up to 3 meters) and Bluetooth (up to 30 meters). At the same time, NFC is more convenient than IrDa which requires line of sight alignment for communication between devices, whereas NFC requires only that the devices be within the NFC operating range of each other. Thus, NFC is one communications technology ideally suited to implementing a restricted range lockbox. In addition, RFID is largely limited to item tracking, and Bluetooth is comparatively more difficult to use because some configuration of the device is required.

NFC operates at 13.56 MHz and transfers data at up to 424 Kbits/second (current data rates are 106 kbps, 212 kbps and 424 kbps). The 13.56 MHz band is not currently regulated, so no license is required. NFC is both a "read" and "write" technology. NFC devices are unique in that they can change their mode of operation to be in reader/writer mode, peer-to-peer mode, or card emulation mode. In reader/writer mode, an NFC device is capable of reading NFC tag types, such as in the scenario of reading an NFC Smartposter tag. The reader/writer mode is on the RF interface compliant with the ISO 14443 and FeliCa schemes. In Peer-to-Peer mode, two NFC devices can exchange data. For example, Bluetooth or Wi-Fi link set up parameters can be shared, and/or data such as virtual business cards or digital photos can be exchanged. Peer-to-Peer mode is standardized on the ISO/IEC 18092 standard. In Card Emulation mode, the NFC device itself acts as an NFC tag (which is a passive device that stores data), appearing to an external reader much the same as a traditional contactless smart card. This enables, for example, contactless payments and eticketing.

Communication between two NFC-compatible devices occurs when they are brought within operating range of each other: a simple wave or touch of a device can establish an NFC connection, which is then compatible with other known wireless technologies such as Bluetooth or Wi-Fi. Because the transmission range is so short, NFC-enabled transactions are inherently secure. Also, the required physical proximity of one device to another is intuitive and gives users the reassurance of being in control of the process.

The underlying layers of NFC technology follow ISO/IEC (International Organization for Standardization/International Electrotechnical Commission, ECMA (European Telecommunications Standards Institute), and ETSI (European Telecommunications Standards Institute) standards. NFC compliant devices in the NFC Reader/Writer mode must support the RF requirements for ISO/IEC 14443A, ISO/IEC 14443 B and FeliCa as outlined in the relevant parts in the ISO 18092. As of this time, there are five published NFC specifications: Smart Poster Record Type Definition (RTD); Data Exchange Format; Record Type Definition; Text RTD and URI RTD. NFC devices are naturally interoperable, as NFC is based on pre-existing contactless payment and ticketing standards that are used on a daily basis by millions of people and devices worldwide. These standards determine not only the "contactless" operating environment, such as the physical requirements of the antennas, but also the format of the data to be transferred and the data rates for that transfer.

Because NFC components are generally smaller, the size of the access device can be kept small, which increases convenience. Also, the size of the lockbox can be reduced.

It is understood that embodiments described herein are not limited to the communication link 115 between the lockbox 200 and the cellular telephone 120 being NFC, and the embodiment described herein may be applicable to other communications links 115 between the lockbox 200 and the cellular telephone 120 including but not limitation to infrared, Bluetooth, Low-Energy Bluetooth, or any other similar communication method known to one of skill in the art.

Figure 3:
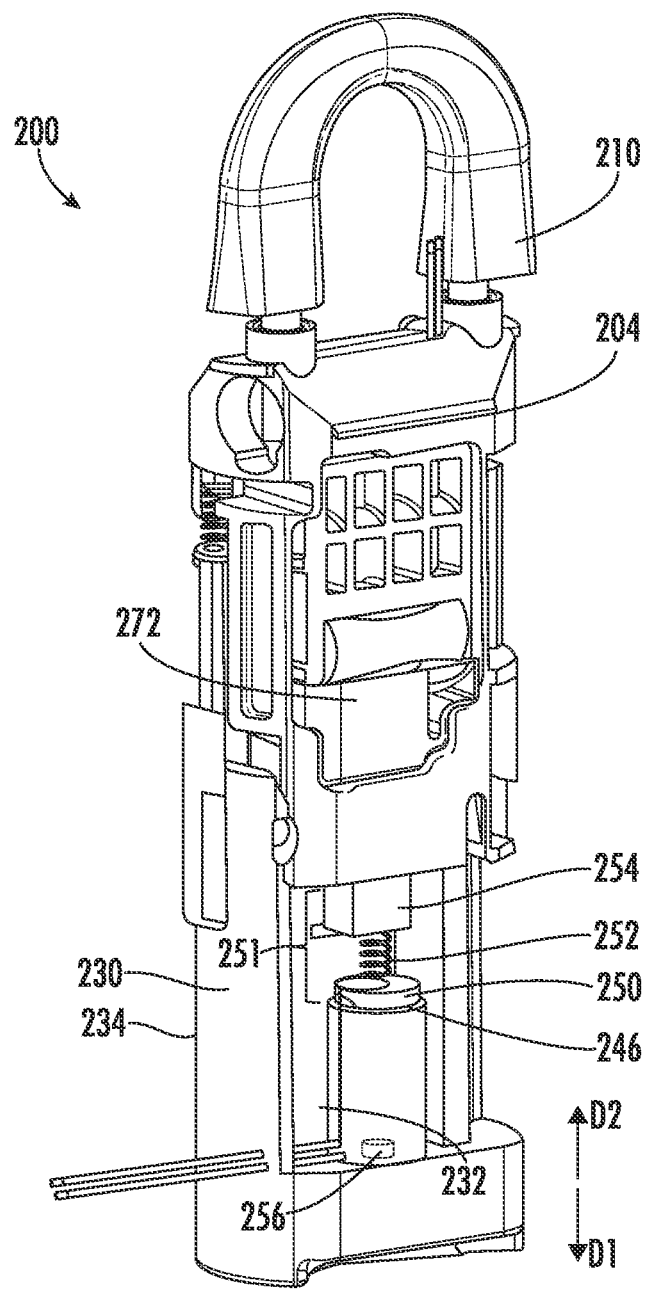
FIG. 3 is a schematic illustration of a lockbox with an outer cover removed, according to an embodiment of the present disclosure.
Figure 4:
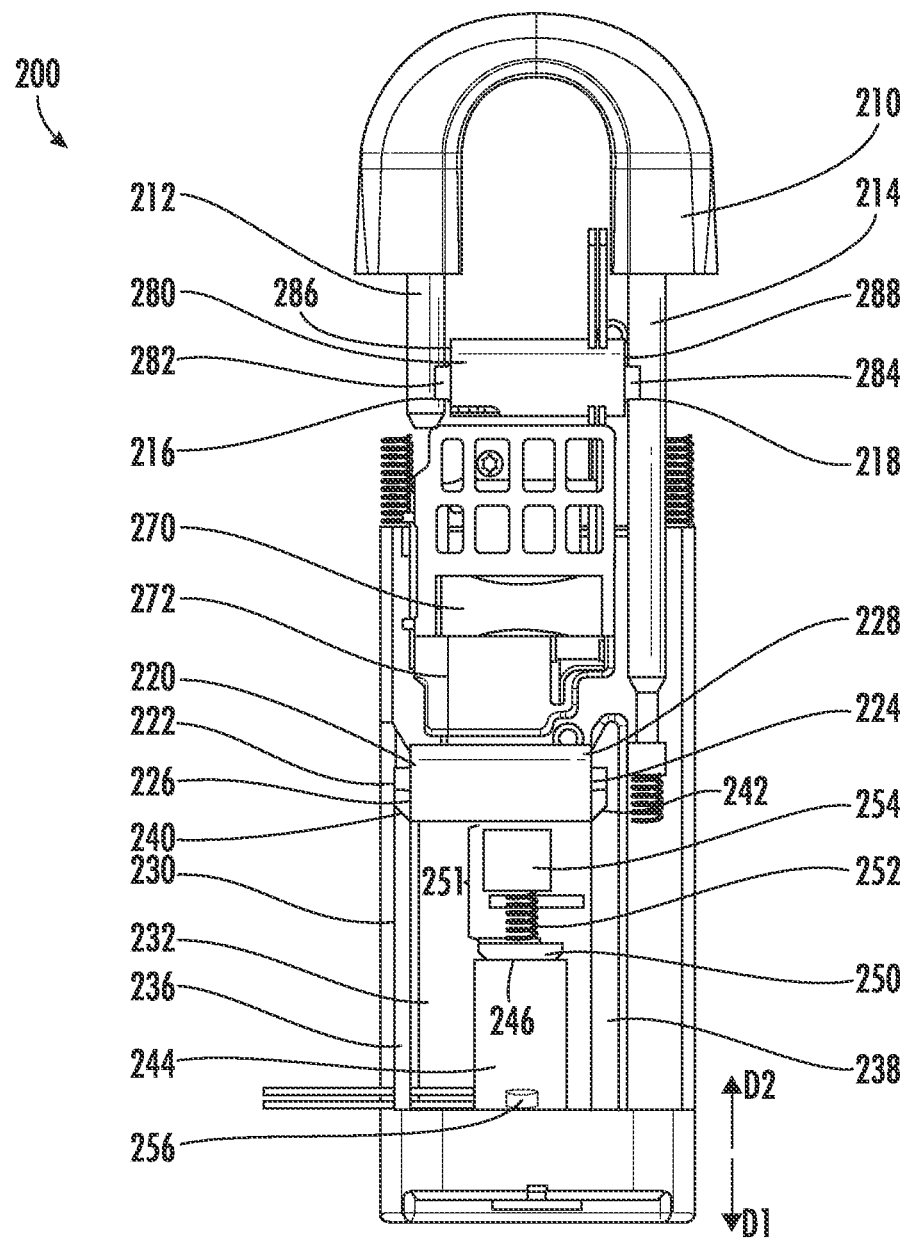
FIG. 4 is a schematic illustration of a lockbox with the outer cover and a chassis removed, according to an embodiment of the present disclosure.

Referring now to FIGS. 3 and 4, a schematic illustration of a lockbox 200 with an outer cover 202 removed is shown in both FIGS. 3 and 4, according to an embodiment of the present disclosure. With the outer cover 202 of the lockbox 200 removed, internal components of the lockbox 200 are clearly visible. FIG. 3 illustrates the lockbox 200 with the structural support frame or chassis 204, while FIG. 4 illustrates the lockbox 200 with the chassis 204 removed to more clearly illustrated the internal components. The lockbox 200 includes the shackle 210, a lower housing solenoid 220, a removable lower housing 230, a primary battery 250, a contact spring 252, an attachment bracket 254, a backup battery 270, an insulator box 272, and a shackle solenoid 280. The outer cover 202 is attached to the chassis 204 is configured to enclose the chassis 204, the lower housing solenoid 220, the removable lower housing 230, and the primary battery 250 within the outer cover 202. The chassis 204 is configured to enclose the insulator box 272 and the insulator box 272 is configured to protect and/or shield the backup battery 270.

The lower housing solenoid 220 is attached to the chassis 204. The removable lower housing 230 is removably connected to the chassis 204 through the lower housing solenoid 220. The lower housing solenoid 220 is configured to disengage with or release the removable lower housing 230 when access is granted to the lockbox 200. Once the lower housing solenoid 220 disengages with or releases the removable lower housing 230, the removable lower housing 230 may be separated from the chassis 204. The removable lower housing 230 may be separated from the chassis 204 by moving the removable lower housing 230 in a first direction D1. The first direction D1 may be a gravitationally downward direction. The removable lower housing 230 may first need to be first pushed in a second direction D2 opposite the first direction D1 before being moved in the first direction D1 to be removed from the chassis 204. The first direction D1 moves the removable lower housing 230 away from the chassis 204 and second direction D2 moves the removable lower housing 230 into the chassis 204.

The removable lower housing 230 includes a first housing side 232 and a second housing side 234 located opposite the first housing side 232. The key storage area 290 may be located on the second housing side 234 and the primary battery 250 may be located on the first housing side 232. In an embodiment, the primary battery 250 may be rechargeable. The removable lower housing 230 may include a first column 236 and a second column 238. The removable lower housing 230 includes a first slot 240 and a second slot 242. The first slot 240 may be located in the first column 236 and the second slot 242 may be located in the second column 238.

The lower housing solenoid 220 includes a first plunger 222 and a second plunger 224 located opposite the first plunger 222. The lower housing solenoid 220 includes a first side 226 and a second side 228 located opposite the first side 226. The first plunger 222 is configured to project away from the first side 226 to engage with or lock into the first slot 240. The second plunger 224 is configured to project away from the second side 228 to engage with or lock into the second slot 242. The lower housing solenoid 220 may be energized during engagement for the first plunger 222 with the first slot 240 and the second plunger 224 with the second slot 242. When the lower housing solenoid 220 is deenergized, the lower housing solenoid 220 releases the removable lower housing 230.

When access is granted to the lockbox 200 the lower housing solenoid 220 is configured to allow the first plunger 222 to retract back into the first side 226, such that the first plunger 222 disengages with the first slot 240. When access is granted to the lockbox 200 the lower housing solenoid 220 is configured to allow the second plunger 224 to retract back into the second side 228, such that the second plunger 224 disengages with the second slot 242. When the first slot 240 and the second slot 242 are engaged the removable lower housing 230 cannot be removed or separated from the chassis 204 because the removable lower housing 230 is secured to the lower housing solenoid 220, which is secured to the chassis 204. When the first slot 240 and the second slot 242 are disengaged the removable lower housing 230 can be removed or separated from the chassis 204 because the removable lower housing 230 is secured to the lower housing solenoid 220, which is secured to the chassis 204.

The shackle 210 includes a first prong 212 and a second prong 214 located opposite the first prong 212. The first prong 212 includes a first shackle slot 216 and the second prong 214 includes a second shackle slot 218.

The shackle 210 is removably connected to the chassis 204 through the shackle solenoid 280. The shackle solenoid 280 includes a first shackle plunger 282 and a second shackle plunger 284 located opposite the first shackle plunger 282. The shackle solenoid 280 includes a first solenoid side 286 and a second solenoid side 288 located opposite the first solenoid side 286. The first shackle plunger 282 is configured to project away from the first solenoid side 286 to engage with or lock into the first shackle slot 216. The second shackle plunger 284 is configured to project away from the second solenoid side 288 to engage with or lock into the second shackle slot 218. The shackle solenoid 280 may be energized during engagement for the first shackle plunger 284 with the first shackle slot 216 and the second shackle plunger 284 with the second shackle slot 218. When the shackle solenoid 280 is deenergized, the shackle solenoid 280 releases the shackle 210.

When access is granted to the lockbox 200 or an authorization to release the shackle 210 is granted, then the shackle solenoid 280 is configured to allow the first shackle plunger 282 to retract back into the first solenoid side 286, such that the first shackle plunger 282 disengages with the first shackle slot 216. To release the shackle 210 may need to be pushed in the first direction D1 into the chassis 204 and then the shackle 210 may need to be pull in the second direction D2 away from the chassis 204. When access is granted to the lockbox 200 the shackle solenoid 280 is configured to allow the second shackle plunger 284 to retract back into the second solenoid side 288, such that the second shackle plunger 284 disengages with the second shackle slot 218. Once the first shackle slot 216 and the second shackle slot 218 are disengaged the shackle 210 may be removed or separated from the chassis 204. When the first shackle slot 216 and the second shackle slot 218 are engaged the shackle 210 cannot be removed or separated from the chassis 204 because the shackle 210 is secured to the shackle solenoid 280, which is secured to the chassis 204.

The primary battery 250 is configured to provide electricity to the lower housing solenoid 220 to power operations of the lower housing solenoid 220. The primary battery 250 is also configured to provide electricity to the shackle solenoid 280 to power operations of the shackle solenoid 280. In one embodiment, the backup battery 270 may be used to power the lower housing solenoid 220 and the shackle solenoid 280 when the primary battery 250 is dead or out of electricity. In another embodiment, the backup battery 270 may only be used to power the lower housing solenoid 220 and the shackle solenoid 280 when the primary battery 250 is dead or out of electricity. The backup battery 270 may be located within the outer cover 202 and/or the chassis 204 in an area that makes the backup battery 270 difficult if not impossible to remove and replace.

The primary battery 250 may be removably secured to the removable lower housing 230, such that the primary battery 250 is configured to move with the removable lower housing 230. The primary battery 250 is attached to or located within the removable lower housing 230. The primary battery 250 is configured to move with the removable lower housing 230 when the removable lower housing 230 is engaged and disengaged with the lower housing solenoid 220. The primary battery 250 may be removably attached to the removable lower housing 230. The removable lower housing 230 includes a battery holder 244 on the first housing side 232 of the removable lower housing 230. The battery holder 244 is configured to removably secure the primary battery 250 within the battery holder 244. The battery holder 244 may be sized to fit the primary battery 250 within the battery holder 244. The battery holder 244 may have a shape similar to that of the primary battery 250. For example, both the battery holder 244 and the primary battery 250 may be cylindrical in shape. The battery holder 244 may have an open top 246 to slide the primary battery 250 into the battery holder 244. The open top 246 may be configured or sized to fit the primary battery 250 through the open top 246. The open top 246 may be circular in shape, as illustrated in FIGS. 3 and 4. There may be an interference fit between the primary battery 250 and the battery holder 244 to secure the primary battery 250 within the battery holder 244.

The primary battery 250 may electrically connect to a first electrical lead 256 and a second electrical lead 251. The first electrical lead 256 is attached to the removable lower housing 230 within the battery holder 244 and the second electrical lead 251 is attached to the chassis 204. Wiring (not shown for simplicity) electrically connect the first electrical lead 256 to the lower housing solenoid 220 and the shackle solenoid 280. The second electrical lead 251 may include a contact spring 252 and/or an attachment bracket 254. The attachment bracket 254 is configured to connect the contact spring 252 to the chassis 204. Wiring (not shown for simplicity) electrically connect the contact spring 252 and/or the chassis 204 to the lower housing solenoid 220 and the shackle solenoid 280. In one embodiment, the first electrical lead 256 may be a positive lead and the second electrical lead 251 may be a negative lead. In another embodiment, the second electrical lead 251 may be a positive lead and the first electrical lead 256 may be a negative lead.

When the primary battery 250 is located within the battery holder 244 the primary battery 250 is electrically connected to the first electrical lead 256. When the removable lower housing 230 is secured to the chassis 204 through the lower housing solenoid 220 the primary battery 250 is electrically connected to the second electrical lead 251. When the lower housing solenoid 220 disengages from the removable lower housing 230 and the removable lower housing 230 is slid out of the outer cover 202, and away from the chassis 204 and the outer cover 202. The primary battery 250 is configured to slide out with the removable lower housing 230 when the removable lower housing 230 slides out of the outer cover 202, and away from the chassis 204 and the outer cover 202. Advantageously, removal and replacement of the primary battery 250 is made easy because the primary battery 250 slides out with the removable lower housing 230. The primary battery 250 disconnects from the second electrical lead 251 when the removable lower housing 230 is slid out of the outer cover 202, and away from the chassis 204 and the outer cover 202.

Figure 5:
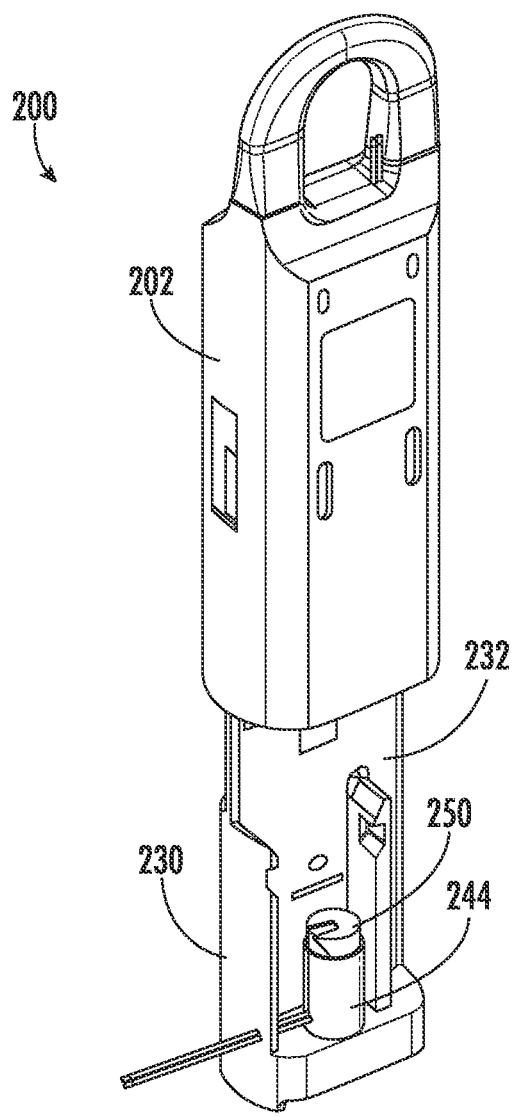
FIG. 5 illustrates a view of the first housing side of a removable lower housing when the removable lower housing is slid away from and out of the outer cover, according to an embodiment of the present disclosure.
Figure 6:
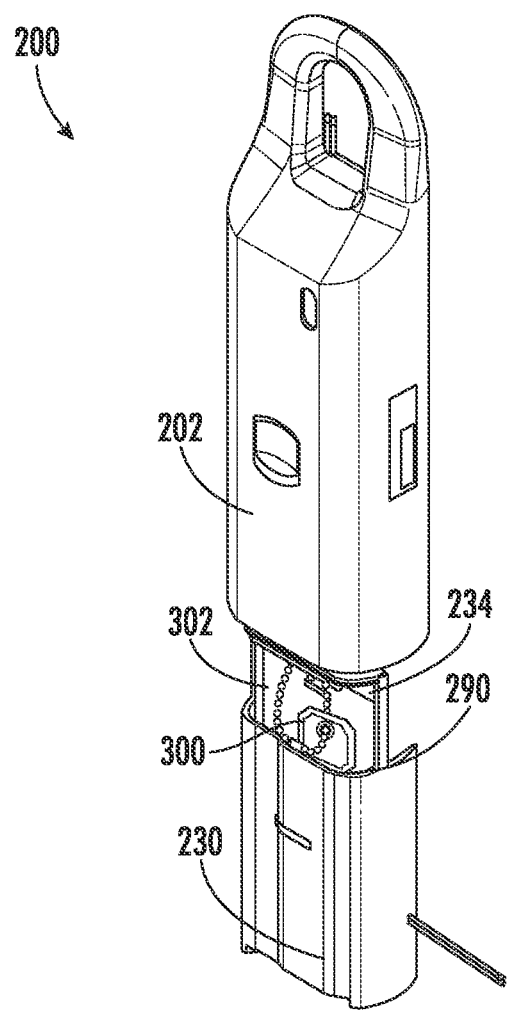
FIG. 6 illustrates a view of the second housing side of a removable lower housing when the removable lower housing is slid away from and out of the outer cover, according to an embodiment of the present disclosure.

Referring now to FIGS. 5 and 6, a schematic isometric illustration of a lockbox 200 is shown in both FIGS. 5 and 6, according to an embodiment of the present disclosure. Both FIGS. 5 and 6 illustrate the removable lower housing 230 being slid away from and out of the outer cover 202.

FIG. 5 illustrates a view of the first housing side 232 of the removable lower housing 230 when the removable lower housing 230 is slid away from and out of the outer cover 202. As illustrated in FIG. 5, the primary battery 250 is retained within the battery holder 244 when the removable lower housing 230 is slid away from and out of the outer cover 202. Therefore, the primary battery 250 is easily accessible for a user to remove and replace when the removable lower housing 230 is slid away from and out of the outer cover 202.

FIG. 6 illustrates a view of the second housing side 234 of the removable lower housing 230 when the removable lower housing 230 is slid away from and out of the outer cover 202. As illustrated in FIG. 6, the key storage area 290 is located on the second housing side 234 of the removable lower housing 230. The key storage area 290 is configured to retain a key 300 or the access card 302 therein. As illustrated in FIG. 6, the key 300 and/or the access card 302 is retained within the key storage area 290 when the removable lower housing 230 is slid away from and out of the outer cover 202. Therefore, the key 300 and/or the access card 302 is easily accessible for a user to remove and replace when the removable lower housing 230 is slid away from and out of the outer cover 202.

Figure 7:
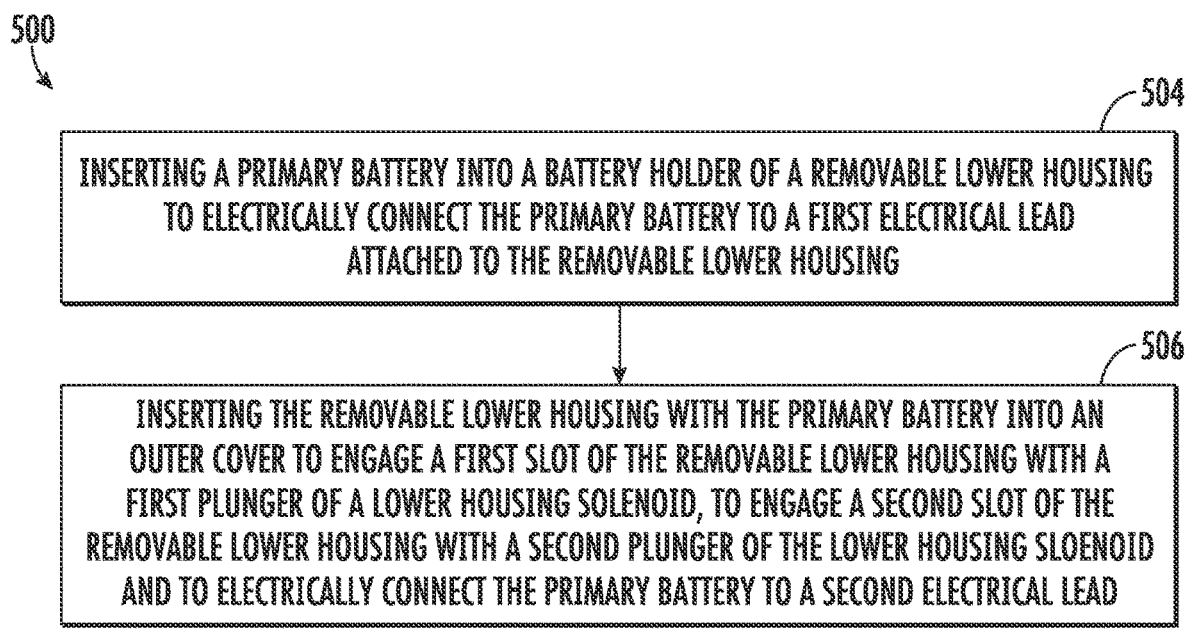
FIG. 7 is a flow process illustrating a method of assembling the lockbox, according to an embodiment of the present disclosure.

Referring to FIG. 7, within continued references to FIGS. 1-6, a flow diagram illustrating a method 500 of assembling the lockbox 200 is illustrated, in accordance with an embodiment of the present disclosure.

A block 504, a primary battery 250 is inserted into a battery holder 244 of a removable lower housing 230 to electrically connect the primary battery 250 to a first electrical lead 256 attached to the removable lower housing 230.

At block 506, the removable lower housing 230 with the primary battery 250 is inserted into an outer cover 202 to engage a first slot 240 of the removable lower housing 230 with a first plunger 222 of a lower housing solenoid 220, to engage a second slot 242 of the removable lower housing 230 with a second plunger 224 of the lower housing solenoid 220, and to electrically connect the primary battery 250 to a second electrical lead 251.

While the above description has described the flow process of FIG. 7 in a particular order, it should be appreciated that unless otherwise specifically required in the attached claims that the ordering of the steps may be varied.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A lockbox comprising:
    a chassis;
    a lower housing solenoid attached to the chassis;
    a removable lower housing removably connected to the chassis through the lower housing solenoid; and
    a battery holder configured to removably secure a primary battery within the battery holder, such that the primary battery is configured to move with the removable lower housing, the primary battery being configured to provide electricity to the lower housing solenoid;

wherein the removable lower housing further comprises a key storage area configured to retain at least one of a key or an access card therein;

wherein the removable lower housing further comprises a first housing side and a second housing side located opposite the first housing side, wherein the battery holder is located on the first housing side and the key storage area is located on the second housing side.

2. The lockbox of claim 1, further comprising an outer cover attached to the chassis, the outer cover being configured to enclose the chassis, the lower housing solenoid, the removable lower housing, and the primary battery within the outer cover.

3. The lockbox of claim 1, wherein the removable lower housing further comprises a first slot and a second slot, and wherein the lower housing solenoid further comprises a first side, a second side opposite the first side, a first plunger is configured to project away from the first side to engage with the first slot, and a second plunger configured to project away from the second side to engage with the second slot.

4. The lockbox of claim 3, wherein the removable lower housing further comprises a first column and a second column, wherein the first slot is located in the first column and the second slot is located in the second column.

5. The lockbox of claim 1, wherein the removable lower housing further comprises a first electrical lead located within the battery holder, and wherein the primary battery is configured to electrically connect to the first electrical lead when the primary battery is located within the battery holder.

6. The lockbox of claim 1, further comprising a second electrical lead attached to the chassis, wherein the primary battery is configured to electrically connect to the second electrical lead when the removable lower housing is secured to the chassis through the lower housing.

7. The lockbox of claim 6, wherein the second electrical lead further comprises a contact spring and an attachment bracket.

8. The lockbox of claim 1, further comprising:

a shackle solenoid, the primary battery being configured to provide electricity to the shackle solenoid; and a shackle removably connected to the chassis through the shackle solenoid.

9. The lockbox of claim 8, wherein the shackle further comprises a first prong, a first shackle slot located in the first prong, a second prong, and a second shackle slot located in the second prong, and wherein the shackle solenoid further comprises a first solenoid side, a second solenoid side opposite the first solenoid side, a first shackle plunger is configured to project away from the first solenoid side to engage with the first shackle slot, and a second shackle plunger configured to project away from the second solenoid side to engage with the second shackle slot.

10. The lockbox of claim 9, further comprising:

a backup battery configured to power the lower housing solenoid and the shackle solenoid when the primary battery is out of electricity.

11. The lockbox of claim 9, wherein the backup battery is positioned within the chassis and outside of the removable lower housing.

* * * * *